United States Patent
Hamawaki

(10) Patent No.: US 7,440,053 B2
(45) Date of Patent: Oct. 21, 2008

(54) TRANSFLECTIVE LIQUID CRYSTAL DISPLAY DEVICE AND METHOD OF MANUFACTURING THE SAME

(75) Inventor: Yoshihiko Hamawaki, Akashi (JP)

(73) Assignee: TPO Hong Kong Holding Limited, Shatin (HK)

(*) Notice: Subject to any disclaimer, the term of this patent is extended or adjusted under 35 U.S.C. 154(b) by 0 days.

(21) Appl. No.: 10/510,589

(22) PCT Filed: Apr. 10, 2003

(86) PCT No.: PCT/IB03/01462

§ 371 (c)(1),
(2), (4) Date: Oct. 8, 2004

(87) PCT Pub. No.: WO03/085449

PCT Pub. Date: Oct. 16, 2003

(65) Prior Publication Data

US 2005/0157229 A1    Jul. 21, 2005

(30) Foreign Application Priority Data

Apr. 11, 2002 (JP) ............................. 2002-108978

(51) Int. Cl.
*G02F 1/1335* (2006.01)

(52) U.S. Cl. .................. 349/114; 349/106; 349/187
(58) Field of Classification Search .............. 349/64, 349/106, 112, 113, 114, 187; 359/599, 891; 345/87, 88

See application file for complete search history.

(56) References Cited

U.S. PATENT DOCUMENTS

| | | | |
|---|---|---|---|
| 6,215,538 B1* | 4/2001 | Narutaki et al. .............. 349/106 |
| 6,850,298 B2* | 2/2005 | Fujimori et al. .............. 349/114 |
| 2001/0008437 A1* | 7/2001 | Fujimori et al. .............. 349/113 |
| 2002/0145688 A1* | 10/2002 | Sekiguchi .................... 349/114 |

* cited by examiner

*Primary Examiner*—Dung T. Nguyen
*Assistant Examiner*—Tai Duong
(74) *Attorney, Agent, or Firm*—Birch, Stewart, Kolasch & Birch, LLP

(57) ABSTRACT

To provide a transflective liquid crystal display device in which an amount of reflected light can be increased in a reflective mode. A liquid crystal panel 10 has a first glass substrate 101 and a second glass substrate 105. A backlight 11 is placed on the outside of the liquid crystal panel 10. A transmissive region 102 has a rectangular shape and is arranged in the center of the pixel. A reflective region 103 is arranged around the transmissive region 102. A reflecting layer 104 is formed in the reflective region 103 of the first glass substrate 101. A scattering layer 106 is formed in the transmissive region 102 of the second glass substrate 105.

7 Claims, 2 Drawing Sheets

TRANSFLECTIVE LIQUID CRYSTAL DISPLAY DEVICE AND METHOD OF MANUFACTURING THE SAME

BACKBROUND OF THE INVENTION

1. Field of the Invention

The present invention relates to a transflective liquid crystal display device and a method of manufacturing the same. More particularly, the present invention relates to a transflective liquid crystal display device in which an amount of the reflected light can be increased in the reflective mode.

2. Description of Related Art

So-called transflective liquid crystal display devices have been put into full-scale practical use in which outside light incident from a front side is reflected to lead to the front side, while incident light from a rear side due to the backlight system is transmitted to lead to the same front side. The liquid crystal display devices of this type provide effective image display by the outside light (ambient light) principally (reflective mode) under well-lighted environments, and by the emitted light in the backlight system principally (transmissive mode) under low-lighted environments.

Such a type of liquid crystal display device is disclosed in a document of the related art of M. Kubo, et al. "Development of Advanced TFT with Good Legibility under Any Intensity of Ambient Light", IDW'99, Proceedings of The Sixth International Display Workshops, AMD3-4, pages 183-186, Dec. 1, 1999, sponsored by ITE and SID".

In this device, each pixel has a reflective region and a transmissive region. The reflective region is provided with, for example, an aluminum reflecting member. Removing the reflecting member partially forms the transmissive region. For example, the transmissive region is disposed at the center in a rectangular pixel region and has a rectangular shape substantially geometrically similar to the pixel region. The reflective region is a portion of the pixel region except the rectangular transmissive region and has a shape of surrounding the transmissive region.

SUMMARY OF THE INVENTION

In conventional transflective liquid crystal display devices, a single pixel has a transmissive region and a reflective region, and each mode uses only light rays in a respective region. In other words, the reflective mode uses only light rays reflected in the reflective region, while the transmissive mode uses only light rays transmitted through the transmissive region.

In the reflective mode, since the outside light reflected in the reflective region is used, there is a demand to increase an amount of reflected light as possible. However, in the conventional transflective liquid crystal display devices, the light incident upon the transmissive region is not used and becomes wasted light in the reflective mode. For example, when the reflective region occupies 70% of a pixel, 30% of light, which passes though the transmissive region, is wasted. Therefore, it is not possible to obtain a sufficient amount of reflected light.

In the view of the foregoing, it is an object of the present invention to provide a transflective liquid crystal display device in which an amount of reflected light can be increased in a reflective mode and method of manufacturing the same.

A transflective liquid crystal display device of the present invention has a liquid crystal panel which has a transmissive region and a reflective region in each pixel and which is constructed of a first substrate and a second substrate faced with each other, and is characterized in that the first substrate has a reflecting member arranged in a first region other than the transmissive region in each pixel, and the second substrate has a scattering member arranged in at least part of the transmissive region.

According to this arrangement, since at least part of the transmissive region on the second substrate has a scattering member, the outside light passing through the transmissive region is scattered by the scattering member in the reflective mode. The scattered light enters the reflective region and the reflecting member reflects the entered light. Thus, in the reflective mode, it is possible to use the light reflected by the reflecting member in the reflective region and the light which is scattered by the scattering member in the transmissive region and then enters the reflective region. As a result, an amount of reflected light can be increased in the reflective mode.

In the transflective liquid crystal display device of the present invention, it is preferable that the second substrate has other scattering member arranged in a second region corresponding to the first region, and that the other scattering member has a lower scattering effect than that of the scattering member.

A transflective liquid crystal display device of the present invention has a liquid crystal panel which has a transmissive region and a reflective region in each pixel and which is constructed of a first substrate and a second substrate faced with each other, and is characterized in that the first substrate has a reflecting member arranged in a first region other than the transmissive region in each pixel, and the second substrate has a first color filter having a scattering effect arranged in at least part of the transmissive region and a second color filter arranged in a second region corresponding to the first region.

According to this arrangement, since at least part of the transmissive region on the second substrate has a first color filter having a scattering effect, the outside light passing through the transmissive region is scattered by the first color filter in the reflective mode. The scattered light enters the reflective region and the reflecting member reflects the entered light. Thus, in the reflective mode, it is possible to use the light reflected by the reflecting member in the reflective region and the light which is scattered by the first color filter in the transmissive region and then enters the reflective region. As a result, an amount of reflected light can be increased in the reflective mode.

In the transflective liquid crystal display device of the present invention, it is preferable that the first color filter has a color different from that of the second color filter.

A method of manufacturing a transflective liquid crystal display device of the present invention is to manufacture a transflective liquid crystal display device having a liquid crystal panel which has a transmissive region and a reflective region in each pixel and which is constructed of a first substrate and a second substrate faced with each other, and has the steps of arranging a reflecting member in a first region other than the transmissive region of the first substrate, and arranging a scattering member in at least part of the transmissive region of the second substrate.

According to this method, it is possible to obtain a transflective liquid crystal display device capable of using in the reflective mode the light reflected by the reflecting member in the reflective region and the light which is scattered by the scattering member in the transmissive region and then enters the reflective region.

The method of manufacturing a transflective liquid crystal display device of the present invention further has the step of arranging other scattering member in a second region of the second substrate corresponding to the first region, where the other scattering member has a lower scattering effect than that of said scattering member.

A method of manufacturing a transflective liquid crystal display device having a liquid crystal panel of the present invention is to manufacture a transflective liquid crystal display device which has a transmissive region and a reflective region in each pixel and which is constructed of a first substrate and a second substrate faced with each other, and has the steps of arranging a reflecting member in a first region other than the transmissive region of the first substrate, arranging a first color filter having a scattering effect in at least part of the transmissive region of the second substrate, and arranging a second color filter in a second region of the second substrate corresponding to the first region.

According to this method, it is possible to obtain a transflective liquid crystal display device capable of using in the reflective mode the light reflected by the reflecting member in the reflective region and the light which is scattered by the first color filter in the transmissive region and then enters the reflective region.

Further scope of the applicability of the present invention will become apparent from the detailed description given hereinafter. However, it tould be understood that the detailed description and specific examples, while indicating prefered embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings whie are given by way of illustration only, and thus are not limitative of the present invention, and wherein.

DESCRIPTION OF THE PREFERRED EMBODIMENT(S)

A subject matter of the present invention is in a transflective liquid crystal display device having a liquid crystal panel which has a transmissive region and a reflective region in each pixel in a pair of substrates faced with each other, forming a scattering member in at least part of the transmissive region on one of the substrates, thereby using in a reflective mode the light reflected by a reflecting member in the reflective region and the light which is scattered by the scattering member in the transmissive region and then enters the reflective region, and thus increasing an amount of reflected light in the reflective mode.

Embodiments of the present invention will be described specifically below with reference to accompanying drawings.

Embodiment 1

This embodiment explains a case of forming a scattering member in a transmissive region in a pixel, scattering outside light transmitted through the transmissive region so that part of the light goes to a reflective region, and thus increasing an amount of reflected light.

Figure 1:
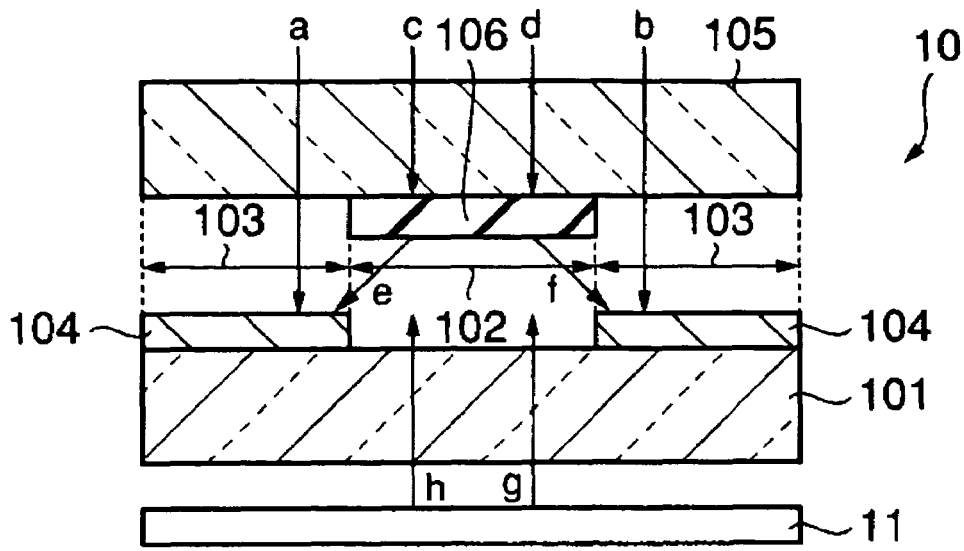
FIG. 1 is a sectional view showing a part of the pixel in a transflective liquid crystal display device according to Embodiment 1 of the present invention.
Figure 4:
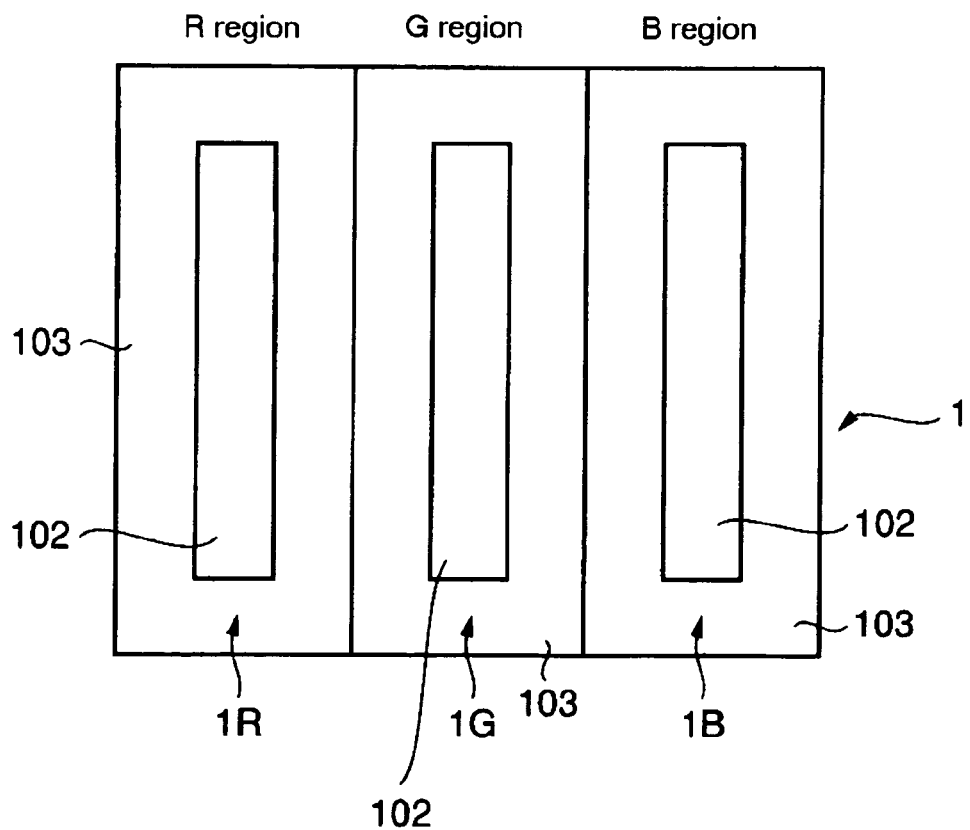
FIG. 4 is a view showing an arrangement of the pixel in a transflective liquid crystal display device of the present invention.

FIG. 1 is a sectional view showing a part of the pixel in a transflective liquid crystal display device according to Embodiment I of the present invention. In other words, FIG. 1 shows either one of an R region $1_R$, G region $1_G$ and B region $1_B$ in a pixel 1 shown in FIG. 4, and herein, is assumed to show the R region $1_R$. This embodiment explains an active-matrix liquid crystal display device. In addition, in FIG. 1, while optical elements are actually present such as a liquid crystal layer, electrodes, color filters and polarizers, descriptions on the elements are omitted to simplify the explanation.

Reference numeral 10 in FIG. 1 denotes a liquid crystal panel of the transflective liquid crystal display device. The liquid crystal panel 10 has a first glass substrate 101 that is a first substrate and a second glass substrate 105 that is a second substrate. A backlight 11 that is a light source in a transmissive mode is placed on the outside of the liquid crystal panel 10.

A transmissive region 102 and reflective region 103 are arranged in the R region. The transmissive region 102 has a rectangular shape and is arranged in the center portion of the R region. The reflective region 103 is arranged around the transmissive region 102.

A reflecting layer 104 that is a reflecting member is formed in the reflective region 103 of the first glass substrate 101. A metal thin film with optically reflecting function such as aluminum may be used as the reflecting layer 104.

A scattering layer 106 that is a scattering member is formed in the transmissive region 102 of the second glass substrate 105. A thin film with light scattering function may be used as the scattering layer 106. For example, a transparent thin film containing transparent resin particles (materials with a scattering effect) with a refractive index different from that of a matrix of the thin film may be used. In this case, the transparent resins and color resist may be used as the matrix. Materials of the matrix and transparent resin particle are not limited particularly, as long as the matrix is different in refractive index from the resin particle. For example, polycarbonate resin and acrylic resin may be used. In addition, the scattering layer 106 is only required to be formed in at least part of the transmissive region 102.

Predetermined wiring and active elements such as TFT are provided on the first glass substrate 101 having the arrangement, while a color filter and ITO electrode that is a common electrode are provided on the second glass substrate 105.

The function of the transflective liquid crystal display device with the above-mentioned arrangement will be described below. First, in the transmissive mode, light from the backlight 11 is passed through the transmissive region 102 and output to the outside. Specifically, as shown in FIG. 1, the light emitted from the backlight 11 is passed through the first glass substrate 101, and only light rays (arrows g and h) passed through the transmissive region 102 are output to the outside through the scattering layer 106 and second glass substrate 105. Meanwhile, light rays from the backlight 11 in the reflective region 103 are reflected by the reflecting layer 104, and not output to the outside.

In the reflective mode, light (outside light) from the outside is reflected in the reflective region 103 and output to the outside. Specifically, as shown in FIG. 1, outside light rays (arrows a to d) are passed through the second glass substrate 105. Light rays (arrows a and b) in the reflective region 103 are reflected by the reflecting layer 104 on the first glass substrate 101, passed through the second glass substrate 105, and then output to the outside. Light rays (arrows c and d) in the transmissive region 102 are scattered by the scattering layer 106 on the second glass substrate 105, and part of the light rays enter the reflective region 103. Therefore, the part of light rays (arrows e and f) scattered by the scattering layer 106 are reflected by the reflecting layer 104 on the first glass substrate 101. In addition, light rays in the transmissive region 102 do not reach the reflecting layer 104, and therefore, are not used in the reflective mode.

In this way, in the reflective mode, since light rays in the transmissive region 102 are scattered by the scattering layer 106, enter the reflective region 103 and are reflected by the reflecting layer 104, the light rays scattered by the scattering layer 106 and then reflected by the reflecting layer 104 are added in predetermined rate to light rays reflected by the reflecting layer 104 in the reflective region 103. As a result, an amount of reflected light output to the outside is increased.

A method will be described below of manufacturing the transflective liquid crystal display device according to this embodiment. A case will be described below where the reflecting layer 104 is formed on the first glass substrate 101. First, a thin film composing the reflecting layer 104 is deposited on the first glass substrate 101. General CVD (Chemical Vapor Deposition) and sputtering may be used as a method of forming a thin film.

Next, a resist is coated on the thin film and baked, and thus a resist layer is formed on the thin film. Then, the resist layer is exposed to the light using a mask with an opening corresponding to the transmissive region 102 and developed, thereby removing the resist layer of the transmissive region 102 of the reflecting layer 104. Subsequently, the exposed reflecting layer 104 is etched and the resist layer remaining on the reflecting layer 104 is removed. In this way, the reflecting layer 104 with an opening for the transmissive region 102 is formed on the first glass substrate 101.

A case will be described next where the scattering layer 106 is formed on the second glass substrate 105. First, a thin film composing the scattering layer 106 is deposited on the second glass substrate 105. For example, a transparent thin film composed of materials containing materials with a scattering effect (transparent resin particles with a refractive index different from that of a matrix of the thin film) may be used as the thin file., For example, general screen-printing may be used as a method of forming a thin film.

Next, a resist is coated on the transparent thin film and baked, and thus a resist layer is formed on the transparent thin film. Then, the resist layer is exposed to the light using a mask with an opening corresponding to the reflective region 103 and developed, thereby removing the resist layer of the reflective region 103 of the scattering layer 106. Subsequently, the exposed scattering layer 106 is etched and the resist layer remaining on the scattering layer 106 is removed. In this way, the scattering layer 106 is formed in the transmissive region 102 on the second glass substrate 105.

Thus, according to this embodiment, it is possible to obtain a transflective liquid crystal display device capable of using in the reflective mode the light reflected by the reflecting member in the reflective region and the light which is scattered by the scattering member in the transmissive region and then enters the reflective region.

Embodiment 2

This embodiment explains a case of forming a scattering member with a relatively high scattering effect in a transmissive region in a pixel, further forming a scattering member with a relatively low scattering effect in a reflective region, scattering outside light transmitted through the transmissive region so that part of the light goes to the reflective region, and thus increasing an amount of reflected light.

Figure 2:
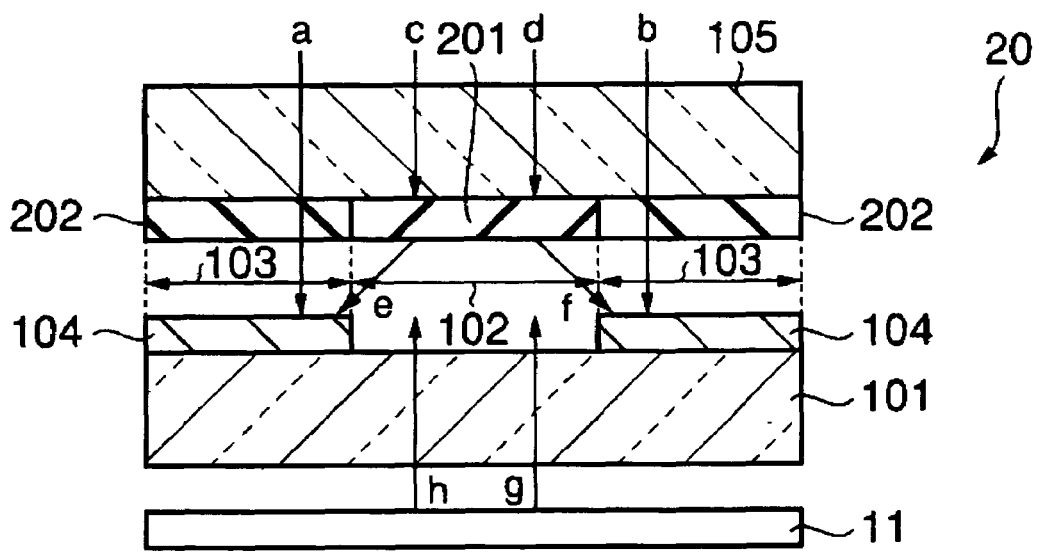
FIG. 2 is a sectional view showing a part of the pixel in a transflective liquid crystal display device according to Embodiment 2 of the present invention.

FIG. 2 is a sectional view showing a part of the pixel in a transflective liquid crystal display device according to Embodiment 2 of the present invention. In other words, FIG. 2 shows either one of an R region $1_R$, G region $1_G$ and B region $1_B$ in a pixel 1 shown in FIG. 4, and herein, is assumed to show the R region $1_R$. This embodiment explains an active-matrix liquid crystal display device. In addition, in FIG. 2, while optical elements are actually present such as a liquid crystal layer, electrodes, color filters and polarizers, descriptions on the elements are omitted to simplify the explanation. Further, in FIG. 2, the same portions as in FIG. 1 are assigned the same reference numerals as in FIG. 1 to omit specific descriptions thereof.

The first glass substrate 101 of the liquid crystal panel 20 shown in FIG. 2 is the same as that in Embodiment 1. The transmissive region 102 on the second glass substrate 105 of the liquid crystal panel 20 is provided with a first scattering layer 201 that is a scattering member with a relatively high scattering effect. The reflective region 103 on the second glass substrate 105 is provided with a second scattering layer 202 that is a scattering member with a relatively low scattering effect. A thin film with light scattering function may be used as the first and second scattering layers 201, 202. For example, a transparent thin film containing transparent resin particles with a refractive index different from that of a matrix of the thin film. Materials of the matrix and transparent resin particles are the same as those in Embodiment 1. The scattering effect can be adjusted by varying the content of the material (for example, transparent resin particle) with the scattering effect. For example, increasing the content of the material with the scattering effect increases the scattering effect, while decreasing the content of the material with the scattering effect decreases the scattering effect.

Predetermined wiring and active elements such as TFT are provided on the first glass substrate 101 having such an arrangement, while a color filter and ITO electrode that is a common electrode are provided on the second glass substrate 105.

The function of the transflective liquid crystal display device with the above-mentioned arrangement will be described below.

First, in the transmissive mode, light from the backlight 11 is passed through the transmissive region 102 and output to the outside. Specifically, as shown in FIG. 2, the light emitted from the backlight 11 is passed through the first glass substrate 101, and only light rays (arrows g and h) passed through the transmissive region 102 are output to the outside through the first scattering layer 201 and second glass substrate 105. Meanwhile, light rays from the backlight 11 in the reflective region 103 are reflected by the reflecting layer 104, and not output to the outside.

In/the reflective mode, light (outside light) from the outside is reflected in the reflective region 103 through the second scattering layer 202 on the second glass substrate 105 and output to the outside. Specifically, as shown in FIG. 2, outside light rays (arrows a to d) are passed through the second glass substrate 105. Light rays (arrows a and b) in the reflective region 103 are reflected by the reflecting layer 104 on the first glass substrate 101 through the second scattering layer 202 on the second glass substrate 105, passed through the second scattering layer 202 and the second glass substrate 105, and then output to the outside. Light rays (arrows c and d) in the transmissive region 102 are scattered by the first scattering layer 201 on the second glass substrate 105, and part of the light rays enter the reflective region 103. Therefore, the part of light rays (arrows e and f) scattered by the first scattering layer 201 are reflected by the reflecting layer 104 on the first glass substrate 101. In addition, light rays in the transmissive region 102 do not reach the reflecting layer 104, and therefore, are not used in the reflective mode.

In this way, in the reflective mode, since light rays in the transmissive region 102 are scattered by the first scattering layer 201, enter the reflective region 103 and are reflected by the reflecting layer 104, the light rays scattered by the first scattering layer 201 and then reflected by the reflecting layer 104 are added in predetermined rate to light rays reflected by the reflecting layer 104 in the reflective region 103. As a result, an amount of reflected light output to the outside is increased.

A method of manufacturing the transflective liquid crystal display device according to this embodiment will be described below.

The reflecting layer 104 is formed on the first glass substrate 101 in the same way as in Embodiment 1. Further, the processes up to forming the first scattering layer 201 in the transmissive region 102 of the second glass substrate 105 are the same as in Embodiment 1.

When the second scattering layer 202 is formed in the reflective region 103 on the second glass substrate 105, a thin film composing the second scattering layer 202 is coated on the second glass substrate 105. For example, a transparent thin film composed of materials (with a scattering effect lower than that of the first scattering layer 201) containing materials with the scattering effect (transparent resin particles with a refractive index different from that of a matrix of the thin film) may be used as the thin film. General screen printing may be used as a method of forming a thin film.

Next, a resist is coated on the transparent thin film and baked, and thus a resist layer is formed on the transparent thin film. Then, the resist layer is exposed to the light using a mask with an opening corresponding to the transmissive region 102 and developed, thereby removing the resist layer of the transmissive region 102 of the second scattering layer 202. Subsequently, the exposed trausparent thin film is etched and the resist layer remaining on the second scattering layer 202 is removed. In this way, the second scattering layer 202 is formed in the reflective region 103 on the second glass substrate 105.

Thus, according to this embodiment, it is possible to obtain a transflective liquid crystal display device capable of using in the reflective mode the light reflected by the reflecting member in the reflective region and the light which is scattered by the first scattering member in the transmissive region and then enters the reflective region. Further, in this embodiment, since the reflective region also has the scattering function, it is possible to perform practical display without providing a scattering reflector, for example, due to out-of-cell scattering film or asperities.

Embodiment 3

This embodiment explains a case of forming a color filer with a scattering effect in a transmissive region in a pixel, further forming a color filter without scattering effect in a reflective region, scattering outside light transmitted through the transmissive region so that part of the light goes to the reflective region, and thus increasing an amount of reflected light.

Figure 3:
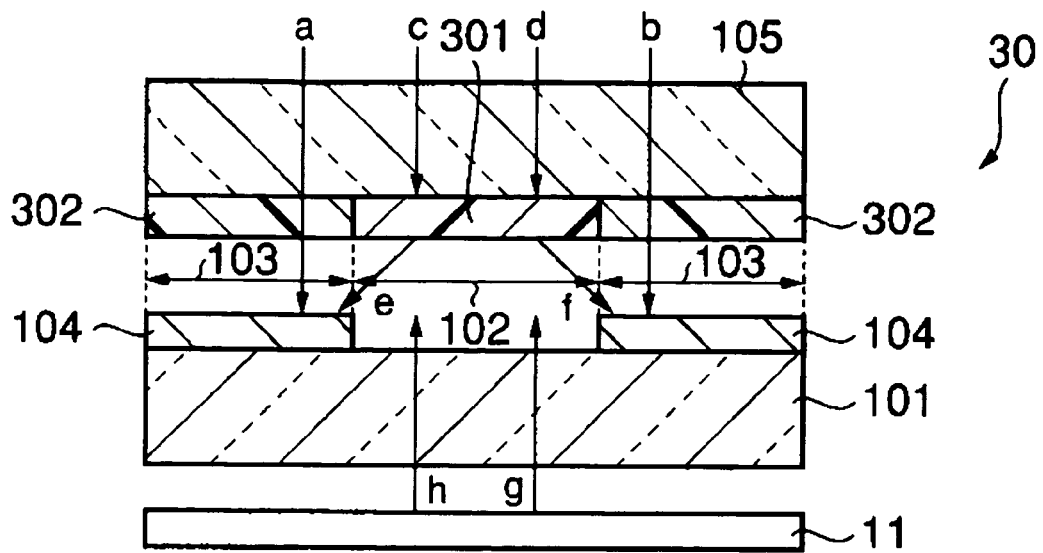
FIG. 3 is a sectional view showing a part of the pixel in a transflective liquid crystal display device according to Embodiment 3 of the present invention.

FIG. 3 is a sectional view showing a part of the pixel in a transflective liquid crystal display device according to Embodiment 3 of the present invention. In other words, FIG. 3 shows either one of an R region $1_R$, G region $1_G$ and B region $1_B$ in a pixel 1 shown in FIG. 4, and herein, is assumed to show the R region $1_R$. This embodiment explains an active-matrix liquid crystal display device. In addition, in FIG. 3, while optical elements are actually present such as a liquid crystal layer, electrodes, and polarizers, descriptions on the elements are omitted to simplify the explanation. Further, in FIG. 3, the same portions as in FIG. 1 are assigned the same reference numerals as in FIG. 1 to omit specific descriptions thereof.

The first glass substrate 101 of the liquid crystal panel 20 shown in FIG. 3 is the same as that in Embodiment 1. The transmissive region 102 on the second glass substrate 105 of the liquid crystal panel 20 is provided with a first color filter 301 with the scattering effect. The reflective region 103 on the second glass substrate 105 of the liquid crystal panel 20 is provided with a color filter 302 without the scattering effect. The first color filter 301 is composed of a colored resin containing materials with the scattering effect, for example, transparent resin particles with a refractive index different from that of a matrix, and thus exhibits the scattering effect. Materials for use in the matrix and transparent resin particles are the same as those in Embodiment 1.

Predetermined wiring and active elements such as TFT are provided on the first glass substrate 101 having such an arrangement, while an ITO electrode that is a common electrode is provided on the second glass substrate 105.

The function of the transflective liquid crystal display device with the above-mentioned construction will be described below. First, in the transmissive mode, light from the backlight 11 is passed through the transmissive region 102 and output to the outside. Specifically, as shown in FIG. 3, the light emitted from the backlight 11 is passed through the first glass substrate 101, and only light rays (arrows g and h) passed through the transmissive 102 are output to the outside through the first color filter 301 and second glass substrate 105. Meanwhile, light rays from the backlight 11 in the reflective region 103 are reflected by the reflecting layer 104, and not output to the outside.

In the reflective mode, light (outside light) from the outside is reflected in the reflective region 103 through the second color filter 302 on the second glass substrate 105 and output to the outside. Specifically, as shown in FIG. 3, outside light rays (arrows a to d) passes through the second glass substrate 105. Light rays (arrows a and b) in the reflective region 103 are reflected by the reflecting layer 104 on the first glass substrate 101 through the second color filter 302 on the second glass substrate 105, passed through the second color filter 302 and the second glass substrate 105, and then output to the outside. Light rays (arrows c and d) in the transmissive region 102 are scattered by the first color filter 301 on the second glass substrate 105, and part of the light rays enter the reflective region 103. Therefore, the part of light rays (arrows e and f) scattered by the first color filter 301 are reflected by the reflecting layer 104 on the first glass substrate 101. In addition, light rays in the transmissive region 102 do not reach the reflecting layer 104, and therefore, are not used in the reflective mode.

In this way, in the reflective mode, since light rays in the transmissive region 102 are scattered by the first color filter 301, enter the reflective region 103 and are reflected by the reflecting layer 104, the light rays scattered by the first color filter 301 and then reflected by the reflecting layer 104 are added in predetermined rate to light rays reflected by the reflecting layer 104 in the reflective region 103. As a result, an amount of reflected light output to the outside is increased.

A method of manufacturing the transflective liquid crystal display device according to this embodiment will be described below. The reflecting layer 104 is provided on the first glass substrate 101 in the same way as in Embodiment 1.

A thin film of colored resin composing the first color filter 301 is deposited on the second glass substrate 105. The colored resin contains, as a material with the scattering effect, for example, transparent resin particles with a refractive index different from that of the colored resin. For example, general screen-printing may be used as a method of coating a thin film of colored resin. A resin colored with pigments or dyes and color resist may be used as the colored resin.

Next, a resist is coated on the thin film of colored resin and baked, and thus a resist layer is formed on the thin film of colored resin. Then, the resist layer is exposed to the light using a mask with an opening corresponding to the reflective region 103 and developed, thereby removing the resist layer of the reflective region 103 on the first color filter 301. Subsequently, the exposed thin film is etched and the resist layer remaining on the first color filter 301 is removed. In this way, the first color filter 301 is formed on the transmissive region 102 on the second glass substrate 105.

Then, a thin film of colored resin composing the second color filter 302 is deposited on the second glass substrate 105. For example, general screen-printing may be used as a method of coating a thin film of colored resin.

Specifically, a resist is coated on the thin film of colored resin and baked, and thus a resist layer is formed on the thin film of colored resin. Then, the resist layer is exposed to the light using a mask with an opening corresponding to the transmissive region 102 and developed, thereby removing the resist layer of the transmissive region 102 of the second color filter 302. Subsequently, the exposed thin film is etched and the resist layer remaining on the second color filter 302 is removed. In this way, the second color filter 302 is formed on the reflective region 103 on the second glass substrate 105. The first and second color filters are formed in the G region and B region in the same way as described above.

Thus, according to this embodiment, it is possible to obtain a transflective liquid crystal display device capable of using in the reflective mode the light reflected by the reflecting member in the reflective region and the light which is scattered by the first color filter in the transmissive region and then enters the reflective region. In this case, since the first color filter 301 serves as the scattering member, the processes can be simplified as compared to Embodiments 1 and 2. In the case where the transmissive and reflective regions are provided with different colors or with different color concentrations, this embodiment does not increase processes, and thus, provides the efficiency in manufacturing.

In addition, this embodiment explains the case of using a method of patterning by photolithography using colored resin, as a method of forming a color filter. However, in the present invention, performing electrodeposition or printing on predetermined portions may form a color filter. In other words, it may be possible to directly form the first color filter 301 and the second color filter 302 respectively in the transmissive region 102 and reflective region 103 using the electrodeposition or printing. Further, while this embodiment explains the case where the second color filter is formed after the first color filter is formed, in the present invention the first color filter may be formed after the second color filter is formed.

The present invention is not limited to the above-mentioned embodiments, and is capable of being carried into practice with various modifications thereof. For example, while Embodiments 1 to 3 explain the case where the liquid crystal display device is an active-matrix type, the present invention is applicable to a case of a passive type of liquid crystal display device where the first and second substrates are provided with row electrodes or column electrodes.

Further in the present invention, the size and material of each structural element are capable of being varied as appropriate without departing from the scope of the present invention. The above-mentioned Embodiments 1 to 3 describe CVD and sputtering as a method of forming a thin film composing the reflecting layer, and further describe screen printing as a method of forming a scattering layer, but the present invention is not limited to such methods. While the above-mentioned Embodiments 1 to 3 describes the case of using transparent resin particles as a material to provide the scattering effect, such a material is not limited to transparent resin particle as long as the material is capable of providing the scattering effect. The content of the material to provide the scattering effect is not limited particularly as long as the content is in a range for exhibiting the scattering effect.

As described above, according to a transflective liquid crystal display device according to the present invention, a liquid crystal panel is provided which has a transmissive region and a reflective region in each pixel and which has a first substrate and a second substrate faced with each other, and the first substrate has a reflecting member arranged in a region other than the transmissive region in each pixel, while the second substrate has a scattering member arranged in at least part of the transmissive region, whereby in the reflective mode, it is possible to use the light reflected by the reflecting member in the reflective region and the light scattered by the scattering member in the transmissive region and enters the reflective region.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A transflective liquid crystal display device comprising:
a liquid crystal panel, the liquid crystal panel having a transmissive region and a reflective region in each pixel, and being constructed of a first and a second substrate facing each other, the first substrate having a reflecting member, and the second substrate having at least one scattering member;
wherein the reflecting member is arranged in a first region other than the transmissive region, and a first scattering member is arranged only in at least part of the transmissive region.

2. The device according to claim 1, wherein the second substrate has a second scattering member arranged in a second region corresponding to the reflective region, the second scattering member having a lower scattering effect than that of the first scattering member.

3. A transflective liquid crystal display device comprising:
a liquid crystal panel, the liquid crystal panel having a transmissive region and a reflective region in each pixel, and being constructed of a first and a second substrate facing each other, the first substrate having a reflecting member arranged in a first region other than the transmissive region, and the second substrate having a first color filter having with a scattering effect arranged in the transmissive region and a second color filter arranged in a second region corresponding to the reflective region.

4. The device according claim 3, wherein said first color filter has a color different from that of the second color filter.

5. A method of providing a transfiective liquid crystal display device having a liquid crystal panel with a transmissive region and a reflective region in each pixel and being constructed of a first and a second substrate facing each other, the method comprising:

arranging a reflecting member in a first region other than the transmissive region of the first substrate; and, arranging at least one scattering member on the second substrate, wherein a first scattering member is arranged only in at least part of the transmissive region of said second substrate, but not in the first region.

6. The method according to claim 5, further comprising the step of arranging a second scattering member in a second region of the second substrate corresponding to the first region, the second scattering member having a lower scattering effect than that of the first scattering member.

7. A method of providing a transflective liquid crystal display device having a liquid crystal panel with a transmissive region and a reflective region in each pixel and being constructed of a first and a second substrate facing each other, comprising the steps of:

arranging a reflecting member in a first region other than the transmissive region of the first substrate;

arranging a first color filter having a scattering effect only in at least part of the transmissive region of the second substrate; and arranging a second color filter in a second region of the second substrate corresponding to the first region.

* * * * *